Oct. 29, 1968 H. A. LEFLET, JR 3,408,173
METHOD OF AND APPARATUS FOR BENDING AND TEMPERING GLASS SHEETS
Filed Jan. 29, 1965 3 Sheets-Sheet 1
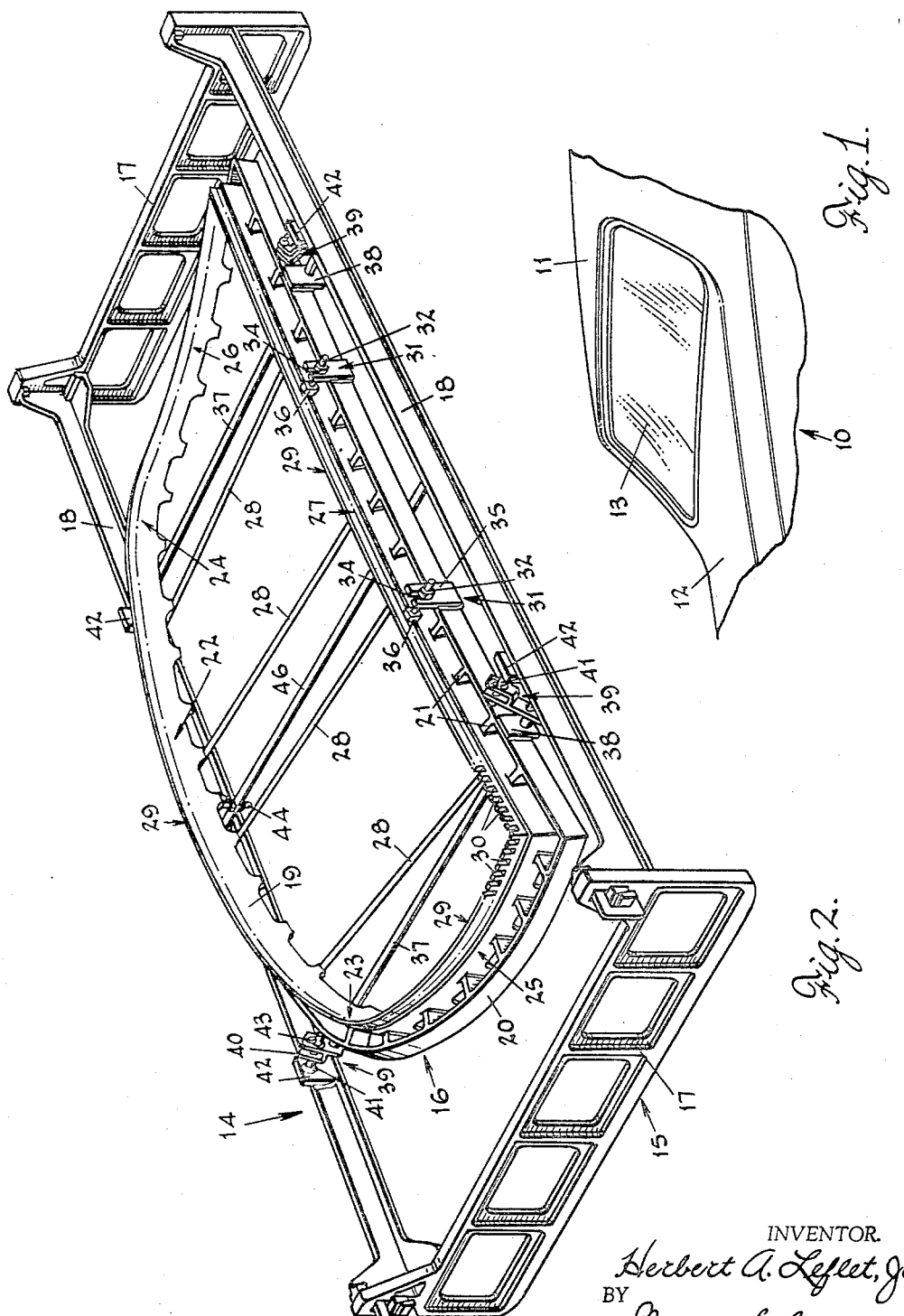
INVENTOR.
Herbert A. Leflet, Jr.
BY
Nobbe & Swope
ATTORNEYS

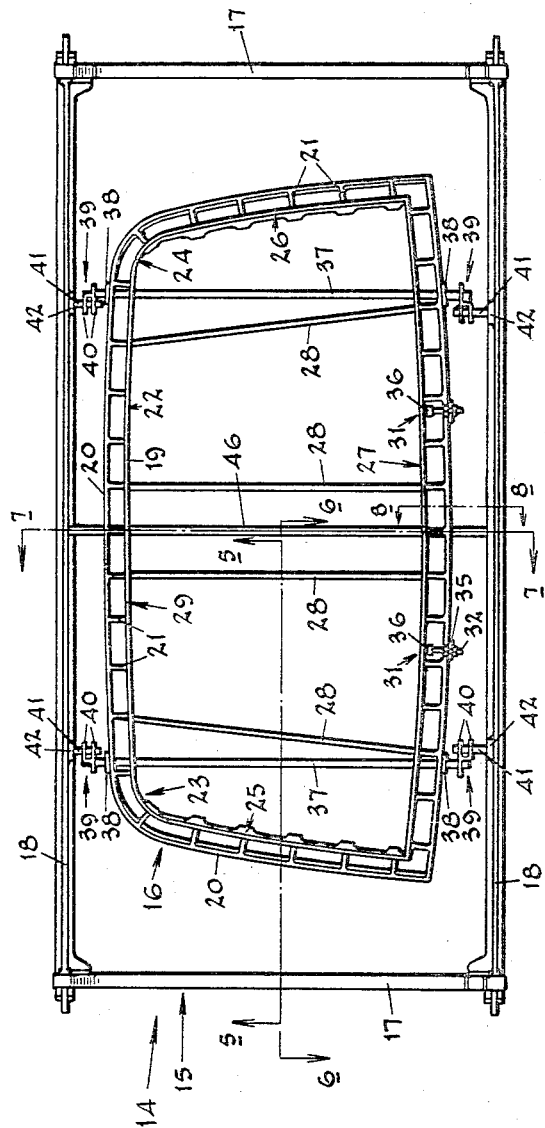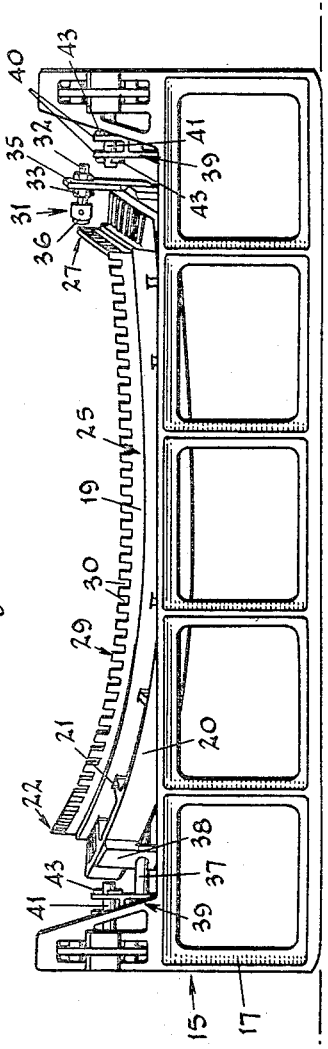

Oct. 29, 1968   H. A. LEFLET, JR   3,408,173
METHOD OF AND APPARATUS FOR BENDING AND TEMPERING GLASS SHEETS
Filed Jan. 29, 1965   3 Sheets-Sheet 3
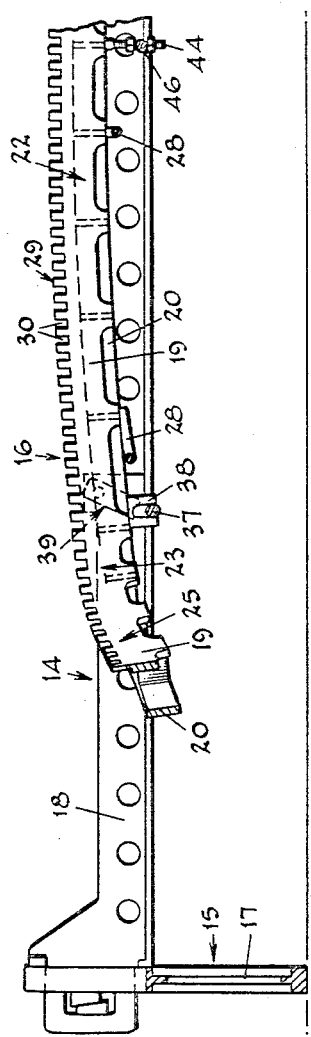
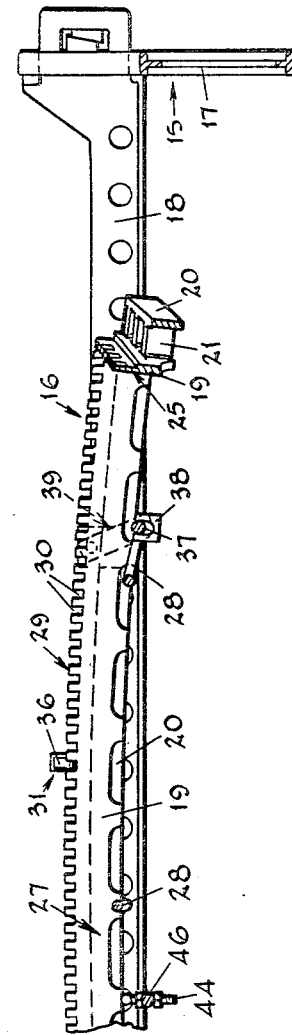
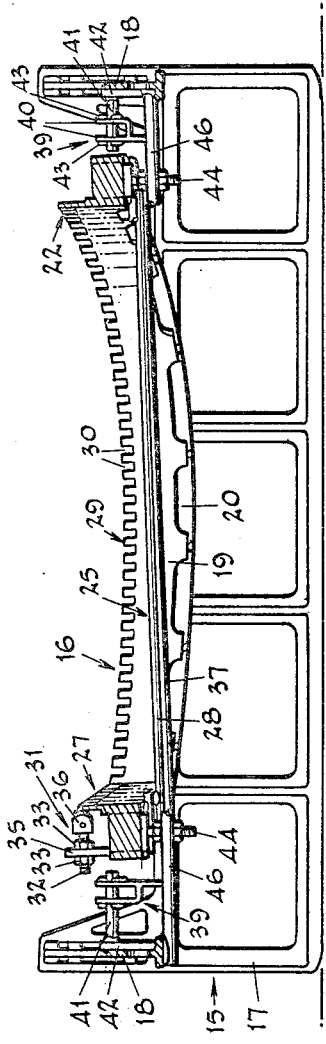
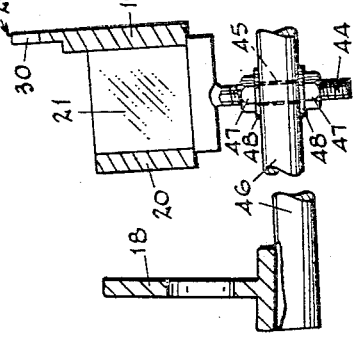
INVENTOR.
Herbert A. Leflet, Jr.
BY
Nobbe & Swope
ATTORNEYS United States Patent Office 3,408,173
Patented Oct. 29, 1968

3,408,173
METHOD OF AND APPARATUS FOR BENDING
AND TEMPERING GLASS SHEETS
Herbert A. Leflet, Jr., Toledo, Ohio, assignor to Libbey-Owens-Ford Glass Company, Toledo, Ohio
Filed Jan. 29, 1965, Ser. No. 428,951
9 Claims. (Cl. 65—104)

ABSTRACT OF THE DISCLOSURE

Bending a glass sheet in opposite directions about its major axes on a peripheral mold and subsequently tempering the bent sheet on the mold. The mold, having upwardly directed shaping surfaces curved convexly in the longitudinal dimension and concavely in the transverse dimension as viewed in elevation, is advanced through the heating and tempering areas along a substantially horizontal path parallel to its transverse axis. One of the convexly curved longitudinal shaping surfaces is elevated above the other sufficiently so that no point along the line of intersection of a vertical plane parallel to the path of movement with a sheet bent into conformity with the shaping surface so as to have an anticlastic configuration is lower than the line of intersection at the lower edge of the sheet. There is thus no depression in the upper surface of the sheet in which a stagnant pocket of air can form as air blasts are directed downwardly thereagainst for tempering purposes.

This invention relates broadly to the bending and tempering of sheets of glass. More particularly, it is concerned with a new and improved method and apparatus for performing the foregoing processes.

Present day bending of glass sheets is generally performed on metal bending molds having shaping surfaces formed thereon to conform to the desired curvatures of the finished sheets. The bending procedure involves first, positioning a glass sheet on the mold, and then heating the sheet to the bending temperature of the glass whereupon the heated sheet sags, due to the influence of gravity, into conformity with the shaping surface of the mold.

Where the bent sheets of glass are to be utilized as windows for automobiles and other vehicles or in various other applications which require a relatively high resistance to breakage, it is desirable to temper the glass to improve its mechanical strength. One well-known process of tempering glass includes heating the glass to approximately its softening point and then rapidly chilling the glass to place the outer surfaces of the sheet in compression and the interior thereof in tension. Such treatment not only improves the mechanical strength of the glass but also modfies its breaking characteristics so that when broken, the glass will disintegrate into many small particles which are relatively harmless as compared to the large dangerous pieces which result from the breakage of ordinary annealed glass.

In commonly used continuous production type bending and tempering furnaces, the sheets are passed directly from the bending to the tempering operations. In this way, the heat required to bend the sheet of glass is utilized in tempering the sheet and, in addition, handling of the sheet is minimized. According to one such procedure, the flat sheets of glass are placed upon the mold in a loading area, are carried by the mold through a bending area wherein the sheets are heated to their softening temperature permitting them to sag into conformity with the shaping surfaces of the mold, and are supported by this mold as they are moved through a tempering area where their temperature is rapidly reduced. Various methods are used to chill the sheets, the most common method being to direct blasts of air against the opposite surfaces of the sheets as they pass through the tempering area. The air blasts are generally directed vertically downward against the upper surface of the sheets from nozzles or blast heads located above the sheets and vertically upward against the lower surface from nozzles located therebelow.

Recent trends in automotive styling have popularized the so-called reverse curvature, anticlastic or concave-convex backlight, that is, a backlight which is curved convexly in its longitudinal dimension and concavely in its transverse dimension as viewed from the exterior of the automobile. The convex bend is normally greater along the longitudinal edge which is to be the upper edge or top of the backlight than along the other or lower longitudinal edge. In producing these backlights according to conventional practices, it was found that a high percentage of breakage occurred while the sheets were passing between the blastheads, with the breaks normally starting along the longitudinal edge of the sheet having greater curvature. It was discovered that this breakage was the result of a pocket formed in the upper surface of the sheet due to the particular curvature to which the sheet is bent. The pocket traps air and thus prevents the desired cooling pattern in the sheet as it passes through the blast heads.

It is therefore a primary object of the invention to provide an improved method of an apparatus for bending and tempering reverse curvature or concave-convex glass sheets.

Another object of the invention is to accomplish the foregoing by eliminating trapped pockets of air adjacent the surface of the bent sheet to thereby achieve the desired cooling pattern.

Another object of the invention is to substantially reduce breakage of the bent sheets as the relatively cooler air is blown thereagainst for tempering.

Still another object of the invention is to bend a sheet into conformity with a shaping surface which is generally inclined along its transverse axis relative to the horizontal.

Yet another object of the invention is to provide a bending and tempering apparatus having a shaping surface whose trailing edge is elevated above the leading edge so that air from the blastheads is exhausted along the sheet in the direction of glass movement.

Other objects and advantages of the invention will become more apparent during the course of the following description when taken in connection with the accompanying drawings.

In the drawings, wherein like numerals are employed to designate like parts throughout the same:

FIG. 1 is a fragmentary perspective view of an automobile in which a glass sheet of the type produced according to the invention is installed;

FIG. 2 is a perspective view of an apparatus for bending and tempering glass sheets embodying the novel features of the present invention;

FIG. 3 is a plan view of an apparatus for bending and tempering glass sheets embodying the novel features of the present invention;

FIG. 4 is an end elevational view of the apparatus;

FIG. 5 is a fragmentary longitudinal sectional view taken along line 5—5 of FIG. 3;

FIG. 6 is a fragmentary longitudinal sectional view taken along line 6—6 of FIG. 3;

FIG. 7 is a transverse sectional view taken along line 7—7 of FIG. 3; and

FIG. 8 is a fragmentary transverse sectional view taken along line 8—8 of FIG. 3.

Referring now to the drawings, and more particularly to FIG. 1, the numeral 10 indicates generally a portion of an automobile body having roof and trunk panel contours particularly well adapted to receive a glazing closure of the type produced according to the present invention. In this respect, the roof 11 of the body is of a generally shallow, convex curvature while the trunk panel or lid 12 is of generally concave curvature in the longitudinal silhouette of the automobile. The numeral 13 indicates generally the glass sheet forming the glazing closure, which in the particular embodiment illustrated is a backlight, and which is advantageously produced according to the present invention. As seen in FIG. 1 and as will be apparent in viewing the bending mold upon which the sheet is bent, to be subsequently described herein, the glass sheet 13 is gently curved or bent convexly about its transverse axis between the longitudinal extremities or ends thereof, and additionally is bent concavely about its longitudinal axis between the top and bottom edges. In the embodiment illustrated in the drawings, the radius of transverse curvature of the sheet about the longitudinal axis is relatively greater, that is, the curvature is less at the upper portion adjacent the roof than at the lower portion. However, both of these curves about the longitudinal axis, as well as the curvature about the transverse axis, are relatively gentle.

Referring now to FIGS. 2 through 8, and in particular to FIG. 2, there is shown the bending apparatus in accordance with the invention, which is designated in its entirety by the numeral 14 and which comprises a rigid framework or support rack 15 on which is carried a skeleton or peripheral ring-type mold indicated generally at 16. The rack 15 includes a pair of end frames 17 and a pair of longitudinally disposed side rails 18 extending between and secured at their respective ends in the end frames 17.

The peripheral ring-type mold 16 is formed by a continuous shaping rail 19 and an outer, bracing rail 20 which are interjoined by means of regularly spaced web members 21. The shaping rail 19 is formed of a first or trailing side member or section 22 which continues through suitably rounded corner portions 23 and 24 into end members or sections 25 and 26. A second or leading side member 27 joins the end members to complete the peripheral or ring-type mold. Stiffening rods 28 extend transversely of the mold at suitable intervals and are fastened to the underside of the shaping and bracing rails thereof to prevent distortion of the shaping surface as the mold is heated.

In plan, the shaping rail 19 conforms substantially to the outline of the sheet, and formed thereon is an upwardly directed shaping surface 29 into conformity with which the sheet sags and which defines the actual curvature to which the sheet is bent. In order to reduce the amount of residual heat which is transferred from the mold to the edges of the glass sheet during tempering, the shaping surface is notched or serrated as at 30. This reduces the area of contact between the glass sheet and the mold and, in addition, permits circulation of air within the periphery of the mold past the lower surface of the glass and out through the notches 30. In order to accurately position a rigid glass sheet to be bent on the mold 16, sheet locating means 31 are provided to engage the edge of the sheet along and above the lower side member 27, the shaping surface of which has very shallow curvature. For this purpose, locator screws 32 provided with adjustable lock nuts 33 are received in slots 34 of mounting plates 35 affixed to the outer surface of the bracing rail 20. By manipulating the lock nuts 33, the sheet engaging head 36 of the locator screws can be moved toward or away from the shaping surface and vertically within the slot 34.

The end members 25 and 26 converge in plan with respect to each other from the leading side member 27 until they merge into the curved corner portions 23 and 24, respectively, and then into the trailing side member 22. As viewed in elevation in FIGS. 4 through 7, the shaping surfaces of the end members 25 and 26 are curved concavely while the shaping surfaces of the trailing and leading side members 22 and 27, respectively, are curved convexly. Thus, as the heated sheet sags into conformity with the shaping surface 29, it assumes the desired configuration described above and illustarted at 13 in FIG. 1.

In order to eliminate the aforementioned air pocket and achieve the desired cooling pattern as the bent sheet subsequently moves past the blast heads of the tempering station (not shown) on the bending apparatus, the bending mold 16 is mounted on the rack 15 so as to incline downwardly at a slight angle in the direction of movement. The apparatus moves through the bending and tempering operations with the side member 27 of the shaping rail 19 leading, and thus the portion of the shaping surface 29 on the leading side member is positioned sufficiently lower than the corresponding shaping surface of the trailing side member 22 so that the air blasts from the vertically oriented blast heads will be directed substantially normal to the surfaces of the sheet at its leading edge. In other words, the portion of the shaping surface on the trailing side member is elevated above the portion of the shaping surface on the leading side member so that no point along the line of intersection of a sheet bent into conformity with the shaping surface and a vertical plane parallel to the direction of movement is lower than the line of intersection at the leading side of the sheet. Due to this inclination, as the sheet moves past the blast heads the air adjacent the upper surface thereof, where the air pocket forms in tempering the glass according to conventional practice, flows across the glass in the direction of glass movement and is exhausted over the leading edge in the direction of movement of the sheet. As thus oriented, the concave curvature of the sheet in the transverse dimension does not create a pocket to entrap air, so that the air sweeps across the surface and cools the sheet in the desired manner.

The mold 16 is carried on the rack 15 in the desired inclined position by mounting rods 37 which extend transversely of the mold adjacent either end thereof. The mounting rods project through brackets 38 affixed to the bracing rail 20, and their ends are received in hangers or links 39. The hangers have bifurcated arms 40 which are pivotally received on posts 41 affixed to plates 42 on the rack side rails 18. Cotter pins 43 through the posts on either side of the bifurcated arms prevent sliding of the arms along the post. The mounting rods are free to turn within the hangers or links 39, and the hangers are freely rotatable on the posts 41 so that the apparatus may expand and contract upon repeated heating and cooling without introducing stress therein or causing the shaping surface to be distorted.

While the mold is constructed and suspended within the rack in such a manner as to minimize the effects of the large temperature changes which occur during repeated use of the device, the distance between the mounting rods 37 is substantial and, if not supported, the shaping rail may buckle or sag in the intermediate region when the device is heated. In order to maintain the shaping surface 29 in the proper position, adjustable supporting posts 44 are secured beneath the trailing and leading side portions 22 and 27, respectively, of the shaping and bracing rails. As best seen in FIG. 8, the supporting posts extend through openings 45 in a support bar 46 extending between and affixed to the side rails 18 parallel to the end frames 17. Adjusting lock nuts 47 are threaded on the support post above and below the supporting bar, with washers 48 on the post between the adjusting nuts and support bar. The adjusting nuts can thus be manipulated so that the shaping surface in the intermediate region of the mold will remain at the proper elevation when the device is heated. It has been found that after repeated heating and cooling in the bending and tempering operation, the contour of the shaping surface may undergo slight permanent changes,

I claim:

1. In a method of bending and tempering glass sheets in which a sheet to be bent is supported on a mold having an upwardly directed shaping surface curved convexly about one major axis and concavely about the other major axis as viewed in elevation and defining the outline and curvature to which the sheet is to be bent, and the sheet is heated to its softening point so as to sag into engagement with said shaping surface and assume an anticlastic configuration, the improvement comprising advancing said mold and the heated, bent sheet thereon through a tempering area along a path substantially parallel to said axis about which said shaping surface is convexly curved, with the trailing side portion elevated above the leading side portion so that no point along the line of intersection of said sheet with a vertical plane parallel to said path is lower than said line of intersection at the leading side portion of said sheet, and directing blasts of relatively cool air downwardly against the upper surface of the advancing sheet whereby creation of a stagnant pocket of said air adjacent said upper surface is avoided.

2. In a method of bending and tempering glass sheets in which a sheet to be bent is supported on an outline type mold having a shaping surface whose end portions are concavely curved downwardly from the ends toward the middle and whose side portions are convexly curved upwardly from the ends toward the middle and said sheet is heated to its softening point so as to sag into conformity with said shaping surface and assume an anticlastic configuration, the improvement comprising advancing said mold and the heated, bent sheet thereon along a path through a tempering area with said convexly curved side portions of the shaping surface extending transversely of said path, and the trailing side portion elevated above the leading side portion so that no point along the line of intersection of said sheet with a vertical plane parallel to said path is lower than said line of intersection at the leading side portion of said sheet whereby there is no depression in the upper surface of said sheet, and directing blasts of relatively cool air vertically downward against the upper surface of the advancing sheet.

3. In a method of bending and tempering glass sheets in which a sheet is supported upon an outline type mold having an upwardly directed shaping surface curved convexly about the transverse axis and concavely about the longitudinal axis as viewed in elevation so as to define an anticlastic configuration to which said sheet is to be bent, and said mold and sheet thereon are advanced along a predetermined path and the advancing sheet is heated to its softening point so as to sag into engagement with said shaping surface and assume said anticlastic configuration, the improvement comprising advancing said mold and the heated, bent sheet thereon along said path through a tempering area with the axis about which the sheet is bent concavely as viewed in elevation transverse to said path and the trailing side portion of said sheet elevated above the leading portion thereof so that no point along the line of intersection of said sheet with a vertical plane parallel to said path is lower than said line of intersection at the leading side portion of said sheet and no depression is created in the upper surface of said sheet, and directing blasts of relatively cool air vertically downward against the upper surface of said advancing sheet whereby creation of a stagnant pocket of said air adjacent said upper surface is avoided.

4. In a method of bending and tempering glass sheets in which a sheet to be bent is supported upon a substantially rectangular outline-type mold having an upwardly directed shaping surface whose end portions are concavely curved in elevation and whose side portions are convexly curved in elevation to define an anticlastic configuration to which said sheet is to be bent, and said sheet is heated to its softening point so as to sag into engagement with said shaping surface and assume said anticlastic configuration, the improvement comprising advancing said mold and the bent sheet thereon along a horizontal path parallel to the axis about which said sheet is curved convexly, with the trailing side portion elevated above the leading side portion sufficiently so that no point along the line of intersection of said bent sheet with a vertical plane parallel to said path is lower than said line of intersection at the leading side portion of said sheet to thereby avoid existence of the depression in the upper surface of said sheet, and directing blasts of relatively cool air vertically downward against said upper surface of said advancing sheet whereby creation of a stagnant pocket of said air adjacent said upper surface is prevented.

5. In glass sheet bending and tempering apparatus of the class in which a glass sheet is conveyed on a bending mold through a heating area where it is heated to its softening point so as to sag into conformity with the shaping surface of the bending mold and thereafter beneath blast means positioned to direct cooling air downwardly against the heated bent sheet to temper it, an improved bending mold comprising a rack and a continuous peripheral shaping rail supported upon said rack for receiving the glass sheet to be bent and tempered, said shaping rail including a pair of spaced, longitudinally extending side members having upwardly directed shaping surface portions curved convexly as viewed in elevation and a pair of transversely extending end members having upwardly directed shaping surface portions curved concavely as viewed in elevation so as to form an anticlastic curvature in said glass sheet bent into conformity therewith, said shaping rail being mounted on said rack with the shaping surface portion of one of said longitudinally extending side members elevated above the shaping surface portion of the other of said longitudinally extending side members sufficiently that no point along the line of intersection of a vertical plane extending transversely of said peripheral shaping rail with said sheet bent into conformity with said shaping surface portions is lower than said line of intersection at the shaping surface portion of said other side member, whereby there is no depression in the upper surface of said sheet within which a stagnant pocket of air can form as blasts of air are directed downwardly against said upper surface by said blast means.

6. In glass sheet bending and tempering apparatus of the class in which a glass sheet is conveyed on a bending mold along a path through a heating area where it is heated to its softening point so as to sag into conformity with the shaping surface of the bending mold and thereafter beneath blast means positioned to direct cooling air downwardly against the heated, bent sheet to temper it, an improved bending mold comprising a rack supporting said mold for movement along said path, said mold including a substantially rectangular shaping rail having an upwardly directed shaping surface thereon curved convexly in the longitudinal dimension and curved concavely in the transverse dimension as viewed in elevation so as to form an anticlastic curvature in said glass sheet bent into conformity therewith, said mold being mounted on said rack with said shaping surface in an inclined position in its transverse dimension so that no point along the line of intersection of a vertical plane extending transversely of said shaping rail with a bent sheet resting on said shaping surface is lower than said line of intersection at the lower edge of said sheet, whereby there is no depression in the upper surface of the bent sheet in which a stagnant pocket of air can form as air blasts are directed downwardly against said upper surface by said blast means.

7. In glass sheet bending and tempering apparatus of the class in which a glass sheet is conveyed on a bending mold along a substantially horizontal path through a heating area where it is heated to its softening point so as to sag into conformity with the shaping surface of the bending mold and assume an anticlastic configuration and thereafter beneath blast means positioned to direct cooling air downwardly against said bent sheet to temper it, an improved outline type bending mold mounted upon a rectangular rack and including a substantially continuous peripheral shaping rail having an upwardly directed shaping surface thereon, said shaping rail including a pair of spaced longitudinally extending side members and a pair of spaced transversely extending end members connecting the ends of said side members, with the shaping surface portions of said side members being convexly curved as viewed in elevation and the shaping surface portions of said end members being concavely curved as viewed in elevation so as to form said anticlastic curvature in said glass sheet bent into conformity therewith, said mold being mounted in an inclined position relative to said rack in the transverse dimension, with the shaping surface portion of one of said side members elevated above the shaping surface portion of the other of said side members sufficiently that no point along the line of intersection of the bent sheet resting on said shaping surface with a vertical plane extending transversely of said shaping rail is lower than said line of intersection at the shaping surface portion of the lower of said side members, whereby there is no depression in the upper surface of the bent sheet within which a stagnant pocket of air can form as blasts of air are directed downwardly against said upper surface by said blast means.

8. An apparatus for bending and tempering glass sheets as claimed in claim 7, wherein said rack comprises a pair of spaced, longitudinally extending side rails interconnected by end frames, and said means for mounting said mold upon said rack includes a pair of mounting rods extending transversely of an affixed to said mold, the ends of said mounting rods being rotatably received in hangers pivotally mounted upon said side rails of said rack.

9. An apparatus for bending and tempering glass sheets as claimed in claim 8, including a support bar extending transversely between said rack side rails intermediate said mounting rods, and adjustable support posts secured to said support bar and said side members of the shaping rail for regulating the elevation of the shaping surface portions of said side members between said mounting rods.

References Cited

UNITED STATES PATENTS

| | | | |
|---|---|---|---|
| 2,736,140 | 2/1956 | Black | 65—291 |
| 2,766,555 | 10/1956 | Jendrisak et al. | 65—103 |
| 3,230,066 | 1/1966 | Carson et al. | 65—107 |

DONALL H. SYLVESTER, *Primary Examiner.*

A. D. KELLOGG, *Assistant Examiner.*